(No Model.)
J. WEED.
DEVICE AND METHOD EMPLOYED IN CUTTING DITCHES FOR AND LAYING TILE DRAINS.
No. 307,246. Patented Oct. 28, 1884.
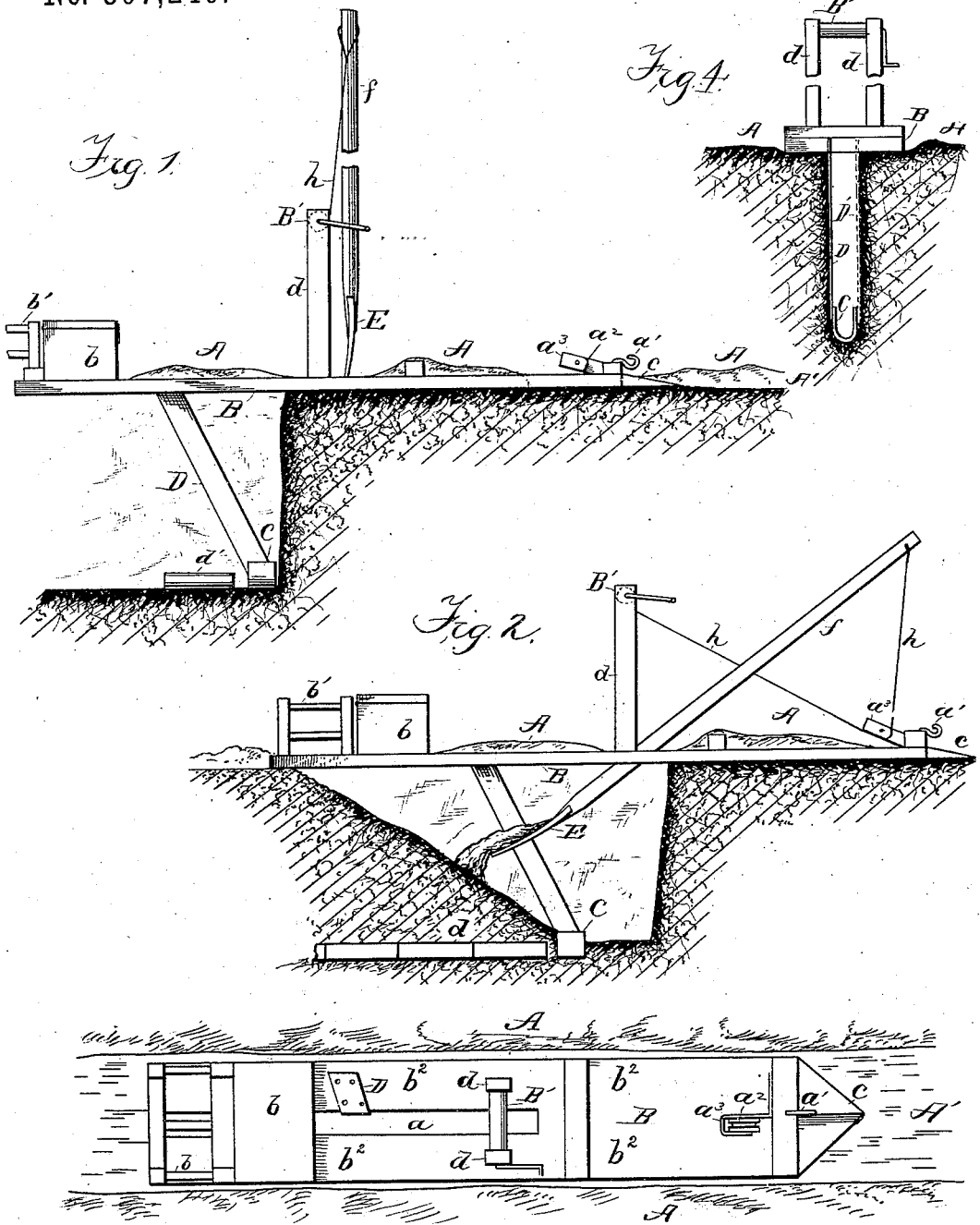
Witnesses
Wm. A. Rosenbaum
H. A. Daniels
Inventor:
James Weed
By W. Burris

UNITED STATES PATENT OFFICE.

JAMES WEED, OF MUSCATINE, IOWA.

DEVICE AND METHOD EMPLOYED IN CUTTING DITCHES FOR AND LAYING TILE DRAINS.

SPECIFICATION forming part of Letters Patent No. 307,246, dated October 28, 1884.

Application filed April 19, 1884. (No model.)

*To all whom it may concern:*

Be it known that I, JAMES WEED, a citizen of the United States of America, residing at Muscatine, in the county of Muscatine and State of Iowa, have invented certain new and useful Improvements in Devices and Methods Employed in Cutting Ditches for and Laying Tile Drains, of which the following is a specification, reference being had therein to the accompanying drawings.

My invention consists of the construction and combinations of the devices employed in cutting ditches for and laying drain-tiling, as hereinafter fully set forth.

In the accompanying drawings, Figure 1 is a vertical section of a trench partly cut and one tile laid and not covered, with the cutter against the bank in front of the ditch, the platform in position, and the spade in position to be thrust into the ground by the windlass. Fig. 2 represents the same view with one tile covered, trench cut in front the length of the tile, and the spade inclined by the windlass, rope, and pulley. Fig. 3 is a plan view of the platform. Fig. 4 is a rear end view of the platform, cutter, and windlass.

A designates the ungraded surface, and A' the graded line of the ground through which a ditch is cut.

B designates a platform having a central longitudinal slot, $a$, the draft-hook $a'$, and a pulley, $a^2$, having its bearings in a frame, $a^3$, attached to the front part of the platform. The platform may be made any required length, of iron or wood, or both, and wide enough to extend over and have proper bearings on each side of the ditch, and it may be constructed to slide or mounted near the ground on wheels adapted to run on the graded surface of the ground. When the ditch is cut as the platform is moved forward, it has its bearing mainly on the ground in front of the ditch. The platform may be provided with one or more boxes, $b$, and racks $b'$, for carrying along the tools and the tiling, and the uncovered spaces $b^2$ may be used for the same purpose. A grading-plow, $c$, may be attached to the front end of the platform in position to cut away any projections and more perfectly level the graded surface to the line parallel with the tile-bed.

B' is a windlass supported in bearings in the upper ends of the standards $dd$, the lower ends of which are supported upon the platform.

C designates a cutter, which may be curved or angular, as required, to fit the shape of the tiling. This cutter is rigidly attached by bolts, screws, or welding to the lower end of the bar D; or it may be formed on the bar, the upper end of which bar is extended through the slot $a$, and is rigidly attached to the platform. This bar may be placed in a vertical position; or it may be inclined at any required angle backward or forward. Another bar, D', may be similarly attached to the other side of the cutter and to the platform, as seen in dotted lines in Fig. 4 of the drawings, to aid in guiding the cutter centrally, and to hold it more firmly and steadily in its forward movement in cutting the bed of the tile at the bottom of the ditch.

E is a spade having a very strong and long handle, $f$, to the upper end of which is attached one end of a rope, $h$, the other end of which rope is extended under and is fastened to the windlass B'.

Preferably the ditch is dug as the platform is moved forward, because then the digging of the ditch and covering of the tiles are both performed in the same operation by means of the windlass. The platform may be drawn forward by an ordinary block and tackle and capstan, or by horse-power, or any other suitable means.

The method of cutting the ditch and laying and covering the tiling as the platform is moved forward is as follows: The surface of the ground along the line of the proposed drain, wide enough to form a track upon which the platform may run or slide freely, is graded to a line parallel with the proposed line of the bed of the drain. A section of the ditch is then dug long enough to receive one section, $d'$, of the tiling, as shown in Fig. 1 of the drawings. The platform is then placed in position upon the graded surface, with the cutter C at the bottom against the bank in front of the ditch. The spade E is inserted through the slot $a$ in front of the windlass, with its cutting end upon the ground, in position to cut a large spit of earth, the handle $f$ being extended vertically above the windlass, and the rope $h$ extended under the windlass. Then by turning the windlass in the direction indicated by the arrow the rope is drawn downward upon the handle, forcing the spade into the earth. Then by reversing the motion of the windlass the rope is slackened and extended over the pulley $a^2$. Then by turning the windlass again in the direction of the arrow the handle of the spade is drawn over against the bank, throwing the spit of earth backward onto the section of tiling just laid, as seen in Fig. 2 of the drawings. When a section of the ditch equal to another section of tiling is thus cut, the platform is moved forward, causing the cutter C to cut the groove on the required grade, forming the bed for another section of tiling, which is then laid behind the cutter and covered by the dirt in cutting another section of the ditch, as before described, and so on till the ditch and tiling are completed. When a ditch has been previously dug the required depth, the surface of the ground being graded to the required line, the platform A is drawn along from one end to the other of the ditch, the cutter C cutting and grading the bed for the tiling, and the loose earth may be removed by a rounded spade or a common grooving-hoe.

What I claim as new, and desire to secure by Letters Patent, is—

1. In a ditching-machine, the platform B, adapted to slide or run on the graded surface of the ground, and having on its front end the leveling scraper or plow $e$, and provided with the tile-bed cutter C, attached to or formed on the bar D, the upper end of which is attached directly to the platform, substantially as and for the purposes described.

2. The combination, with the platform B, having the slot $a$, of the windlass B', spade E, having the long handle $f$, the rope $h$, attached to the handle $f$ and extended around the windlass, and the pulley $a^2$, substantially as and for the purpose described.

In testimony whereof I affix my signature in presence of two witnesses.

JAMES WEED.

Witnesses:
T. R. FITZGERALD,
ED. A. IRWIN.